(12) United States Patent
Jeong et al.

(10) Patent No.: US 12,512,137 B2
(45) Date of Patent: Dec. 30, 2025

(54) MULTILAYERED VERTICAL SPIN-ORBIT TORQUE DEVICES

(71) Applicant: Samsung Electronics Co., Ltd., Suwon-si (KR)

(72) Inventors: Jaewoo Jeong, Los Altos, CA (US); Dmytro Apalkov, San Jose, CA (US); Ikhtiar, San Jose, CA (US); Roman Chepulskyy, Milpitas, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 220 days.

(21) Appl. No.: 18/185,961

(22) Filed: Mar. 17, 2023

(65) Prior Publication Data

US 2024/0249759 A1 Jul. 25, 2024

Related U.S. Application Data

(60) Provisional application No. 63/440,264, filed on Jan. 20, 2023.

(51) Int. Cl.
| | | |
|---|---|---|
| *G11C 11/00* | (2006.01) | |
| *G11C 11/16* | (2006.01) | |
| *G11C 11/23* | (2006.01) | |
| *G11C 11/35* | (2006.01) | |
| *H10B 61/00* | (2023.01) | |
| *H10N 50/01* | (2023.01) | |

(Continued)

(52) U.S. Cl.
CPC ........ *G11C 11/161* (2013.01); *G11C 11/1675* (2013.01); *G11C 11/23* (2013.01); *G11C 11/35* (2013.01); *H10B 61/00* (2023.02); *H10N 50/01* (2023.02); *H10N 50/10* (2023.02); *H10N 50/85* (2023.02)

(58) Field of Classification Search
CPC ... G11C 11/161; G11C 11/1675; G11C 11/23; G11C 11/35; H10B 61/00; H10N 50/01; H10N 50/10; H10N 50/85; H10N 50/80
USPC .......................................................... 365/158
See application file for complete search history.

(56) References Cited

U.S. PATENT DOCUMENTS

| | | | |
|---|---|---|---|
| 9,490,421 B2 | 11/2016 | Apalkov et al. | |
| 9,608,039 B1 | 3/2017 | Apalkov et al. | |
| 10,411,184 B1 * | 9/2019 | Nikitin | .................. G11C 11/161 |

(Continued)

FOREIGN PATENT DOCUMENTS

| | | |
|---|---|---|
| CN | 114429968 A | 5/2022 |
| TW | I600187 B | 9/2017 |

OTHER PUBLICATIONS

EPO Extended European Search Report dated Jun. 12, 2024, issued in corresponding European Patent Application No. 23218566.0, 11 pages.

(Continued)

*Primary Examiner* — Tha-O H Bui
(74) *Attorney, Agent, or Firm* — Womble Bond Dickinson (US) LLP

(57) ABSTRACT

A magnetic memory device includes a spin-orbit interaction active core having a number of layers stacked along a longitudinal axis and a magnetic junction extending around the longitudinal axis and substantially surrounding at least a portion of the spin-orbit interaction active core. The magnetic junction includes a free layer, a reference layer, and a tunnel barrier layer between the free layer and the reference layer.

20 Claims, 3 Drawing Sheets

(51) Int. Cl.
*H10N 50/10* (2023.01)
*H10N 50/85* (2023.01)

(56) References Cited

U.S. PATENT DOCUMENTS

| | | | |
|---|---|---|---|
| 10,998,493 B2* | 5/2021 | Komura | G11C 11/1675 |
| 11,165,012 B2 | 11/2021 | Ying et al. | |
| 11,289,143 B2 | 3/2022 | Song et al. | |
| 11,411,047 B2 | 8/2022 | Manipatruni et al. | |
| 2019/0273202 A1 | 9/2019 | Nikitin et al. | |
| 2019/0305212 A1 | 10/2019 | Gosavi et al. | |
| 2020/0106004 A1 | 4/2020 | Komura | |
| 2020/0341079 A1 | 10/2020 | Swerts et al. | |
| 2020/0365308 A1 | 11/2020 | Lin et al. | |
| 2021/0005235 A1 | 1/2021 | Min et al. | |
| 2021/0327960 A1 | 10/2021 | Xiao et al. | |
| 2021/0359199 A1 | 11/2021 | Lin et al. | |
| 2021/0367143 A1 | 11/2021 | Lee et al. | |

OTHER PUBLICATIONS

Gonzalez-Hernandez, Rafael, et al., "Efficient Electrical Spin Splitter Based on Nonrelativistic Collinear Antiferromagnetism," Physical Review Letters, 2021, vol. 126, 6 pages.

Wang, Peng, et al., "Giant Spin Hall Effect and Spin-Orbit Torques in 5d Transition Metal-Aluminum Alloys from Extrinsic Scattering," Advanced Materials, 2022, vol. 34., 8 pages.

Wang, Yi, et al., "Room Temperature Giant Charge-to-Spin Conversion at SrTiOJ/LaAl03 Oxide Interface," Nano Letters, 2017, 16 pages.

Yun, Jijun, et al., "Spin-orbit torque induced magnetization switching in Pt/Co/Ta structures with perpendicular magnetic anisotropy," Journal of Physics D: Applied Physics, 2017, vol. 50, 2017, 7 pages.

* cited by examiner

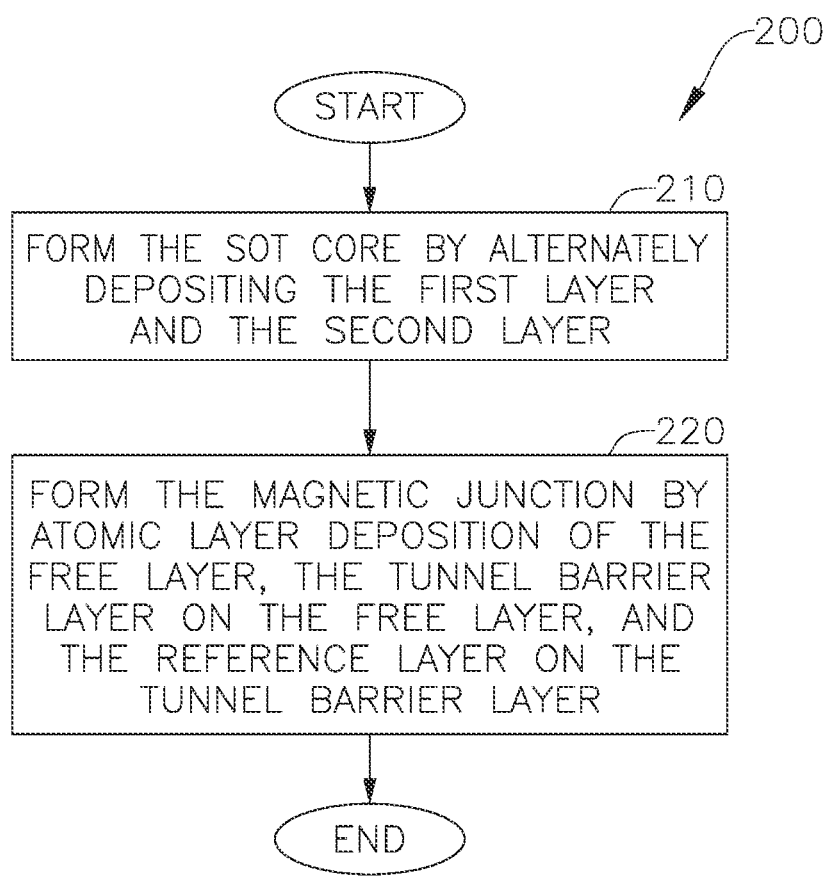

MULTILAYERED VERTICAL SPIN-ORBIT TORQUE DEVICES

CROSS-REFERENCE TO RELATED APPLICATION(S)

The present application claims priority to and the benefit of U.S. Provisional Application No. 63/440,264, filed Jan. 20, 2023, the entire content of which is incorporated herein by reference.

BACKGROUND

1. Field

The present disclosure relates to spin-orbit torque (SOT) magnetic random-access memory (MRAM) devices and methods of manufacturing SOT-MRAM devices.

2. Description of the Related Art

Magnetic random-access memory (MRAM) devices store information utilizing magnetic materials as an information recording medium. One type of MRAM is a spin-transfer-torque magnetic random-access memory (STT-MRAM). Another type of MRAM is a spin-orbit-torque magnetic random-access memory (SOT-MRAM). However, SOT-MRAM devices have not been demonstrated as a product due to the difficulty in finding suitable materials for SOT generation that exhibit high spin orbit torque, thermal stability, and suitable resistivity.

SUMMARY

The present disclosure relates to various embodiments of a magnetic memory device. In one embodiment, the magnetic memory device includes a spin-orbit interaction active core having a number of layers stacked in a longitudinal direction and a magnetic junction around at least a portion of the spin-orbit interaction active core. The magnetic junction includes a free layer, a reference layer, and a tunnel barrier layer between the free layer and the reference layer.

The first layer and/or the second layer of the spin-orbit interaction active core may include a nitride.

The nitride may be titanium nitride (TiN), scandium nitride (ScN), aluminum nitride (AlN), vanadium nitride (VN), chromium nitride (CrN), or combinations thereof.

The first layer and/or the second layer of the spin-orbit interaction active core may include a perovskite oxide.

The perovskite oxide may be lanthanum aluminate ($LaAlO_3$), strontium titanate ($SrTiO_3$), bismuth ferrite ($BiFeO_3$), or combinations thereof.

The first layer and/or the second layer of the spin-orbit interaction active core may include a material having a rutile structure.

The material may be oxide ($RuO_2$), titanium dioxide ($TiO_2$), vanadium oxide ($VO_2$), or combinations thereof.

The first layer and/or the second layer of the spin-orbit interaction active core may include B2 type iridium-aluminum (IrAl).

One of the first and second layers of the spin-orbit interaction active core may include a heavy metal, and the other of the first and second layers of the spin-orbit interaction active core may include a main group metal.

The heavy metal may be platinum (Pt), tungsten (W), tantalum (Ta), iridium (Ir), or combinations thereof, and the main group metal may be aluminum (Al), germanium (Ge), gallium (Ga), or combinations thereof.

The present disclosure also relates to various embodiments of a method of manufacturing the magnetic memory device. In one embodiment, the method includes forming the spin-orbit interaction active core by alternately depositing the first layer and the second layer into the number of layers stacked in the longitudinal direction, and forming the magnetic junction around the portion of the spin-orbit interaction active core including depositing, by atomic layer deposition, the free layer, the tunnel barrier layer on the free layer, and the reference layer on the tunnel barrier layer.

Forming the spin-orbit interaction active core may include selecting a number of each of the first and second layers, materials of the first and second layers, and thicknesses of the first and second layers to achieve a desired resistivity of the spin-orbit interaction active core along the longitudinal direction.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is a flowchart illustrating tasks of a method of manufacturing the embodiment of the SOT-MRAM device illustrated in FIGS. 1A-1C.

DETAILED DESCRIPTION

Figure 1A:
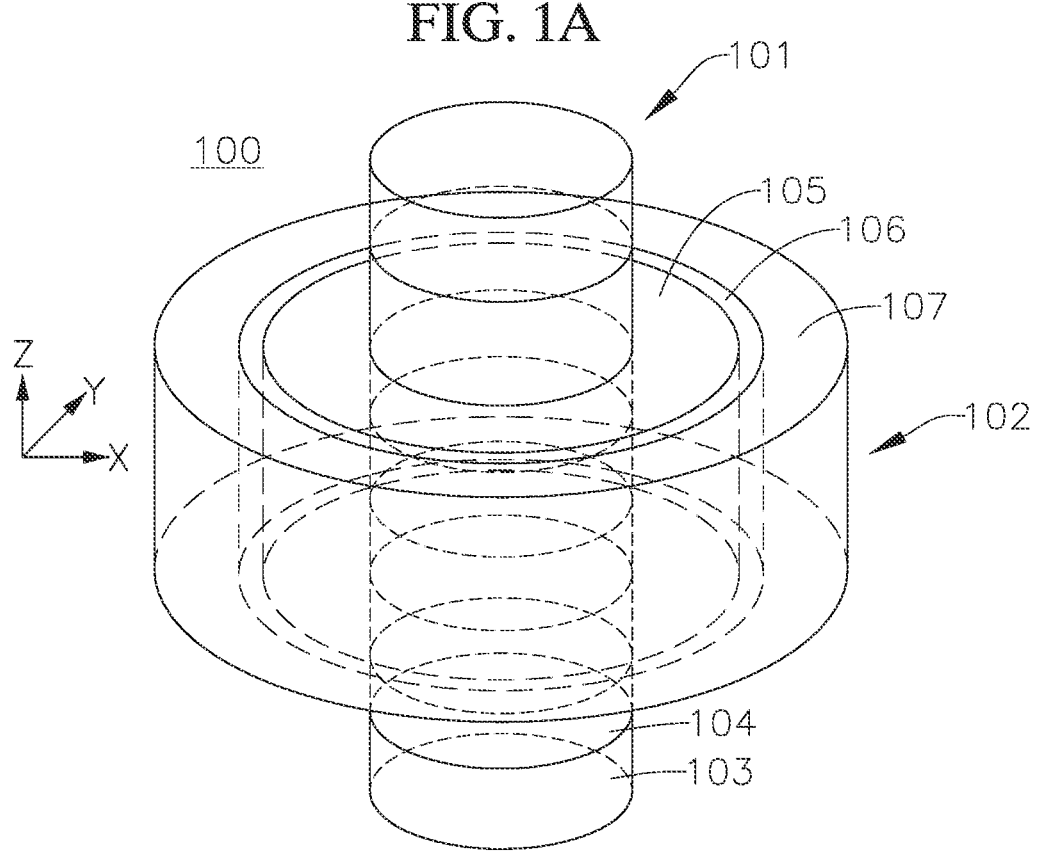
FIGS. 1A-1C are a perspective view, a top view, and a cross-sectional view of a spin-orbit-torque magnetic random-access memory (SOT-MRAM) device according to one embodiment of the present disclosure.

The present disclosure relates to various embodiments of a magnetic memory device, a method of manufacturing a magnetic memory device, and a method of programming a magnetic memory device. In one or more embodiments, the magnetic memory device includes a spin-orbit torque (SOT) core having a stacked multilayer structure, and a magnetic junction including a free layer, a tunnel barrier layer, and a reference layer (e.g., formed as concentric annular layers) around at least a portion of the SOT core. The number of layers, the thickness of the layers, and the materials of the layers of the SOT core may be selected to achieve (tune) the resistance of the SOT core for the desired application. Additionally, the multilayered structure of the SOT core improves SOT efficiency compared to related art magnetic memory devices because electric scattering can more readily occur in a perpendicular direction when current flows longitudinally (i.e., in the z-direction) through the SOT core.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The example embodiments are described in the context of particular magnetic junctions and magnetic memories having certain components. One of ordinary skill in the art will readily recognize that embodiments of the present invention are consistent with the use of magnetic junctions and magnetic memories having other and/or additional components and/or other features not inconsistent with embodiments of the present invention. The method and system are also described in the context of current understanding of spin-orbit interaction, the spin transfer phenomenon, of magnetic anisotropy, and other physical phenomena. Consequently, one of ordinary skill in the art will readily recognize that theoretical explanations of the behavior of the method and system are made based upon this current understanding of spin-orbit interaction, spin transfer, magnetic anisotropy and other physical phenomenon. However, the methods and systems described herein are not dependent upon a particular physical explanation. One of ordinary skill in the art will also readily recognize that the methods and systems are described in the context of a structure having a particular relationship to the substrate. However, one of ordinary skill in the art will readily recognize that the method and system are consistent with other structures. In addition, the method and system are described in the context of certain layers being synthetic and/or simple. However, one of ordinary skill in the art will readily recognize that the layers could have another structure. Furthermore, the method and system are described in the context of magnetic junctions, spin-orbit interaction active layers, and/or other structures having particular layers. However, one of ordinary skill in the art will readily recognize that magnetic junctions, spin-orbit interaction active layers, and/or other structures having additional and/or different layers not inconsistent with the method and system could also be used. Moreover, certain components are described as being magnetic, ferromagnetic, and ferrimagnetic. As used herein, the term magnetic could include ferromagnetic, ferrimagnetic or like structures. Thus, as used herein, the term "magnetic" or "ferromagnetic" includes, but is not limited to ferromagnets and ferrimagnets. The method and system are also described in the context of single magnetic junctions. However, one of ordinary skill in the art will readily recognize that the method and system are consistent with the use of magnetic memories having multiple magnetic junctions. Further, as used herein, "in-plane" is substantially within or parallel to the plane of one or more of the layers of a magnetic junction. Conversely, "perpendicular" corresponds to a direction that is substantially perpendicular to one or more of the layers of the magnetic junction.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

Figure 1B:
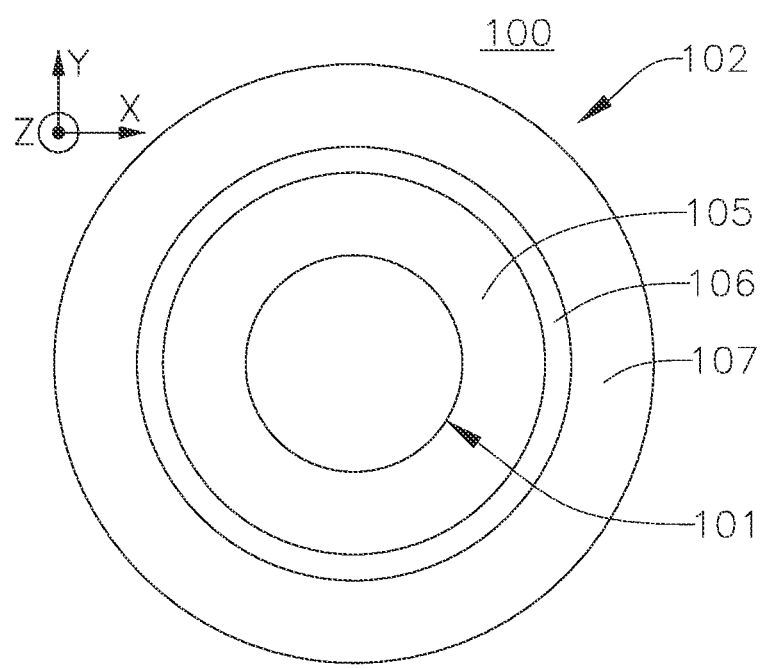
Figure 1C:
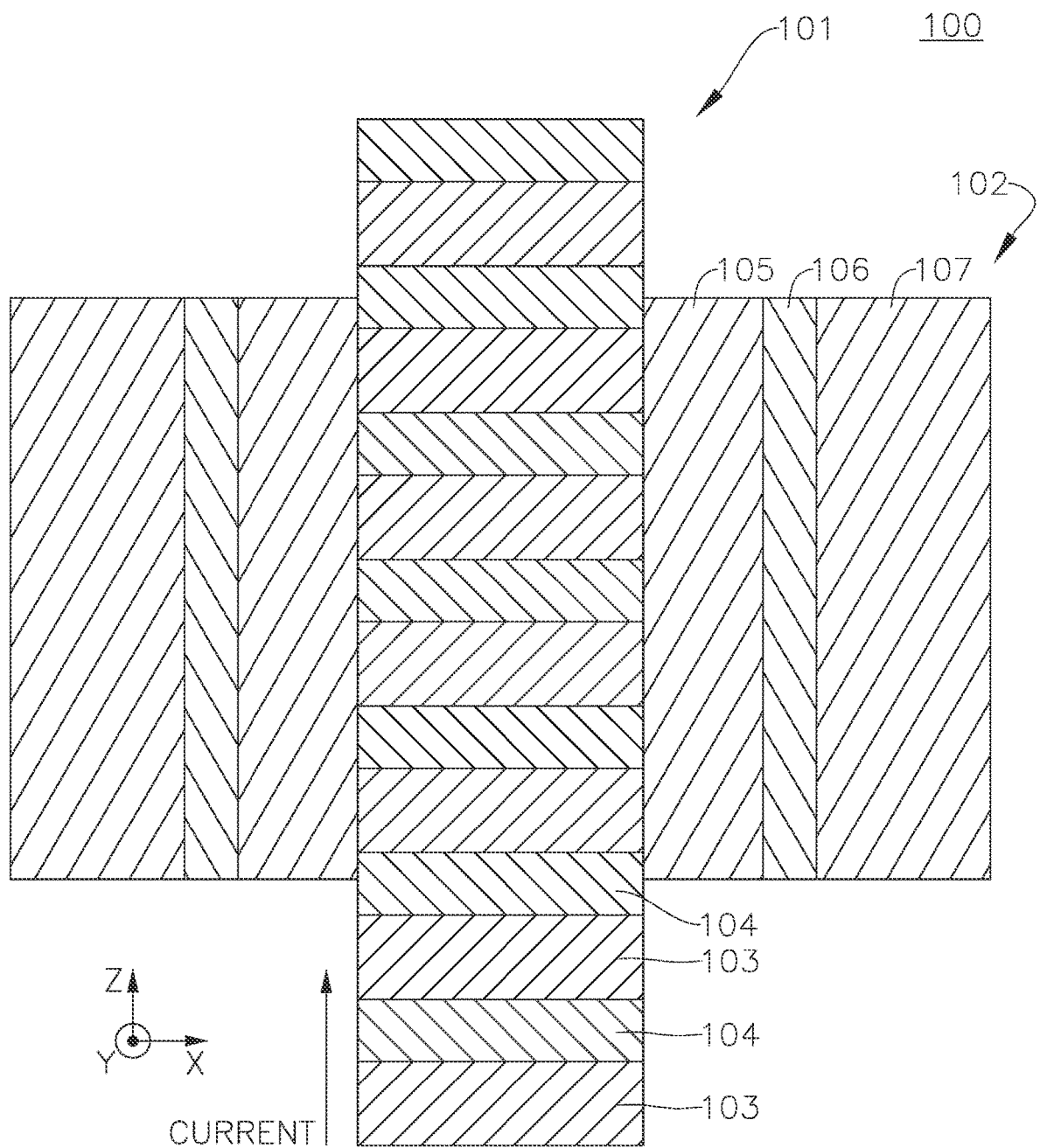

With reference now to FIGS. 1A-1C, a spin-orbit-torque magnetic random-access memory (SOT-MRAM) device 100 according to one embodiment of the present disclosure includes a spin-orbit interaction active core 101 and a vertical magnetic junction 102 circumferentially around (e.g., circumferentially surrounding, as a series of annular layers) at least a portion of the spin-orbit interaction active core 101. The vertical magnetic junction 102 is programmable using spin-orbit torque. In the illustrated embodiment, the spin-orbit interaction active core 101 is a cylindrical member including a stack of alternating first layers 103 and second layers 104. The first and second layers 103, 104 are stacked in a longitudinal direction (z-axis direction) and the magnetic junction 102 extends around the z-axis and at least partially surrounds the spin-orbit interaction active core 101. The resistivity and the spin orbit torque efficiency of the spin-orbit interaction active core 101 can be tuned by selecting the number, the material(s), and the thickness(es) of the first and second layers 103, 104 and thereby adjusting the resistance of the spin-orbit interaction active core 101. The spin-orbit interaction active core 101 is highly resistive in the longitudinal direction (z-direction) along which the first and second layers 103, 104 are stacked and the spin-orbit torque interaction active core 101 is highly conductive in a lateral direction (x- and y-directions) perpendicular to the direction in which the first and second layers 103, 104 are stacked. In this manner, the spin-orbit interaction active core 101 exhibits anisotropic resistivity, which results in improved spin-orbit torque (SOT) efficiency due to the increased electrical scattering that occurs when a current flows along the longitudinal direction (z-direction) (i.e., the anisotropic resistivity of the spin-orbit interaction active core 101 enables electric scattering to more readily occur in a direction perpendicular to the direction in which the current flows, which leads to larger spin dependent scattering of the SOT-MRAM device 100).

In one or more embodiments, at least one of the first layer 103 and/or the second layer 104 includes a nitride, such as titanium nitride (TiN), scandium nitride (ScN), aluminum nitride (AlN), vanadium nitride (VN), chromium nitride (CrN), or combinations thereof. In one or more embodiments, at least one of the first layer 103 and/or the second layer 104 includes a perovskite oxide, such as lanthanum aluminate (LaAlO$_3$), strontium titanate (SrTiO$_3$), bismuth ferrite (BiFeO$_3$), or combinations thereof. In one or more embodiments, at least one of the first layer 103 and/or the second layer 104 includes a material having a rutile structure, such as ruthenium oxide (RuO$_2$), titanium dioxide (TiO$_2$), vanadium oxide (VO$_2$), or combinations thereof. In one or more embodiments, one of the first layer 103 or the second layer 104 includes a heavy metal (e.g., platinum (Pt), tungsten (W), tantalum (Ta), iridium (Ir), or combinations thereof) and the other of the first layer 103 or the second layer 104 includes a main group metal (e.g., from aluminum (Al), germanium (Ge), gallium (Ga), or combinations thereof). In one or more embodiments, at least one of the first layer 103 and/or the second layer 104 includes B2 type iridium-aluminum (IrAl).

In the illustrated embodiment, the magnetic junction 102 is a hollow cylindrical member comprising a series of concentric annuli, including an inner free layer 105, tunnel barrier layer 106 beyond (e.g., directly or indirectly on) an outer surface of the inner free layer 105, and an outer reference layer 107 (i.e., a pinned or fixed layer) beyond (e.g., directly or indirectly on) an outer surface of the tunnel barrier layer 106 (i.e., the magnetic junction 102 includes the tunnel barrier layer 106 between the inner free layer 105 and the outer reference layer 107). The inner free layer 105 and the outer reference layer 107 are magnetic, and the tunnel barrier layer 106 is nonmagnetic. The outer reference layer 107 has a fixed or pinned magnetic direction and the magnetic direction of the inner free layer 105 is switchable between stable magnetic states at least in part using a write current passing through the spin-orbit interaction active core 101 along the longitudinal direction (z-axis) of the spin-orbit interaction active core 101. In this manner, the inner free layer 105 is programmable using spin-orbit torque.

In one or more embodiments, the inner free layer 105 and/or the outer reference layer 107 may include a metal such as platinum (Pt), palladium (Pd), tantalum (Ta), tungsten (W), rhodium (Rh). For instance, in one or more embodiments, the outer reference layer 107 may include CoFe, CoFeB, FeB, and/or CoPt. In one or more embodiments, the outer reference layer 107 may be a synthetic antiferromagnet (SAF) including multiple ferromagnetic layers interleaved with nonmagnetic layer(s) such as ruthenium (Ru). In one or more embodiments, the inner free layer 105 may include CoFe, CoFeB and/or Fe. In one or more embodiments, the tunnel barrier layer 106 may include an insulating oxide, such as MgO (e.g., crystalline MgO having a 200 orientation for enhanced tunneling magnetoresistance (TMR)), aluminum oxide and/or titanium oxide, amongst others.

The magnetic junction 102 may also include one or more optional polarization enhancement layer(s) (PEL(s)) having a high spin polarization. In one or more embodiments, the one or more optional PELs may include iron (Fe), CoFe and/or CoFeB. In one or more embodiments, the optional PEL may be between the outer reference layer 107 and the tunnel barrier layer 106 and/or between the tunnel barrier layer 106 and the inner free layer 105. Furthermore, in one or more embodiments, an optional pinning layer may be used to fix the magnetization of the outer reference layer 107. The optional pinning layer may be an antiferromagnetic layer or multilayer that pins the magnetization of the outer reference layer 107 by an exchange-bias interaction. The magnetic junction 102 may also include optional seed layer(s) and/or optional capping layer(s). Although in the illustrated embodiment the magnetic junction 102 is a hollow cylindrical member extending along the z-axis perpendicular to the x-y plane, in one or more embodiments the magnetic junction 102 may have any other suitable shape (e.g., conical, or a hollow prism) and the magnetic junction 102 may not extend perpendicular to the x-y plane (e.g., an axis of the magnetic junction 102 may be canted relative to the x-y plane). In one or more embodiments, the magnetic junction 102 may be the same as or similar to any one of the embodiments of the magnetic junction disclosed in U.S. application Ser. No. 15/968,514, filed May 1, 2018, the entire content of which is incorporated herein by reference.

In operation, a current is driven through the spin-orbit interaction active core 101 along the z-direction (i.e., a longitudinal dimension along which the first and second layers 103, 104 are stacked). Due to the anisotropic resistivity of the spin-orbit interaction active core 101, when the current is driven in the z-direction, a spin current is generated in a direction perpendicular to the z-direction (i.e., the x-y plane). The spin current in the x-y plane is configured to change the magnetization direction of the free layer 105. In this manner, the magnetization of the free layer 105 functions as a memory storage device.

With reference now to FIG. 2, a method 200 of manufacturing a spin-orbit-torque magnetic random-access memory (SOT-MRAM) device according to one embodiment of the present disclosure includes a task 210 of forming a spin-orbit interaction active core by alternately and repeatedly depositing a first layer and a second layer on the first layer into a stack of layers. The number of first layers and second layers, the material(s) of the first and second layers, and the thickness(es) of the first and second layers deposited in task 210 may be selected depending on the desired resistivity of the spin-orbit interaction active core along its longitudinal dimension and thus the spin orbit torque efficiency of the spin-orbit interaction active core.

In the illustrated embodiment, the method 200 also includes a task 220 of forming a magnetic junction circumferentially around (e.g., circumferentially surrounding) at least a portion of the spin-orbit interaction active core formed in task 210. In one or more embodiments, the task 220 includes depositing, by atomic layer deposition, a free layer, a tunnel barrier layer on the free layer, and a reference layer on the tunnel barrier layer. In one or more embodiments, the task 220 may be performed utilizing atomic layer deposition (ALD).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims.

What is claimed is:

1. A magnetic memory device comprising:
a spin-orbit interaction active core comprising a plurality of layers stacked along a longitudinal axis, the plurality of layers comprising a first layer and a second layer on the first layer; and
a magnetic junction extending around the longitudinal axis and substantially surrounding at least a portion of the spin-orbit interaction active core, the magnetic junction comprising a free layer, a reference layer, and a tunnel barrier layer between the free layer and the reference layer,
wherein the magnetic junction surrounds the first layer and the second layer.

2. The magnetic memory device of claim 1, wherein the spin-orbit interaction active core comprises a plurality of the first layer and a plurality of the second layer alternately arranged on top of each other along the longitudinal axis.

3. The magnetic memory device of claim 1, wherein at least one of the first layer or the second layer comprises a nitride.

4. The magnetic memory device of claim 3, wherein the nitride is selected from the group consisting of titanium nitride (TiN), scandium nitride (ScN), aluminum nitride (AlN), vanadium nitride (VN), chromium nitride (CrN), or combinations thereof.

5. The magnetic memory device of claim 1, wherein at least one of the first layer or the second layer comprises a perovskite oxide.

6. The magnetic memory device of claim 5, wherein the perovskite oxide is selected from the group consisting of lanthanum aluminate ($LaAlO_3$), strontium titanate ($SrTiO_3$), bismuth ferrite ($BiFeO_3$), and combinations thereof.

7. The magnetic memory device of claim 1, wherein at least one of the first layer or the second layer comprises a material having a rutile structure.

8. The magnetic memory device of claim 7, wherein the material having the rutile structure is selected from the group consisting of ruthenium oxide ($RuO_2$), titanium dioxide ($TiO_2$), vanadium oxide ($VO_2$), and combinations thereof.

9. The magnetic memory device of claim 1, wherein at least one of the first layer or the second layer comprises B2 type iridium-aluminum (IrAl).

10. The magnetic memory device of claim 1, wherein one of the first layer or the second layer comprises a heavy metal, and wherein another one of the first layer or the second layer comprises a main group metal.

11. The magnetic memory device of claim 10, wherein the heavy metal is selected from the group consisting of platinum (Pt), tungsten (W), tantalum (Ta), and iridium (Ir), and wherein the main group metal is selected from aluminum (Al), germanium (Ge), gallium (Ga), and combinations thereof.

12. A method of programming the magnetic memory device of claim 1, the method comprising:
passing a current through the spin-orbit interaction active core in the longitudinal axis; and
exerting a spin orbit torque on the free layer of the magnetic junction in response to the current passing through the spin-orbit interaction active core, the spin orbit torque switching a magnetic state of the free layer.

13. A method of manufacturing a magnetic memory device, the method comprising:
forming a spin-orbit interaction active core by alternately depositing a first layer and a second layer into a plurality of layers stacked along a longitudinal axis;
forming a magnetic junction extending around the longitudinal axis and substantially surrounding a portion of the spin-orbit interaction active core, comprising depositing, by atomic layer deposition, a free layer, a tunnel barrier layer on the free layer, and a reference layer on the tunnel barrier layer,
wherein the magnetic junction surrounds the first layer and the second layer.

14. The method of claim 13, wherein the forming the spin-orbit interaction active core further comprises selecting a number of each of the first and second layers, materials of the first and second layers, and thicknesses of the first and second layers to achieve a desired resistivity of the spin-orbit interaction active core along the longitudinal axis.

15. The method of claim 13, wherein the spin-orbit interaction active core comprises a plurality of the first layer and a plurality of the second layer alternately arranged on top of each other along the longitudinal axis.

16. The method of claim 13, wherein at least one of the first layer or the second layer comprises a nitride selected from the group consisting of titanium nitride (TiN), scandium nitride (ScN), aluminum nitride (AlN), vanadium nitride (VN), chromium nitride (CrN), or combinations thereof.

17. The method of claim 13, wherein at least one of the first layer or the second layer comprises a perovskite oxide selected from the group consisting of lanthanum aluminate ($LaAlO_3$), strontium titanate ($SrTiO_3$), bismuth ferrite ($BiFeO_3$), and combinations thereof.

18. The method of claim 13, wherein at least one of the first layer or the second layer comprises a material having a rutile structure selected from the group consisting of ruthenium oxide ($RuO_2$), titanium dioxide ($TiO_2$), vanadium oxide ($VO_2$), and combinations thereof.

19. The method of claim 13, wherein at least one of the first layer or the second layer comprises B2 type iridium-aluminum (IrAl).

20. The method of claim 13, wherein one of the first layer or the second layer comprises a heavy metal selected from the group consisting of platinum (Pt), tungsten (W), tantalum (Ta), and iridium (Ir), and wherein another one of the first layer or the second layer comprises a main group metal selected from aluminum (Al), germanium (Ge), gallium (Ga), and combinations thereof.

* * * * *